May 12, 1953 G. L. HALL 2,638,383
APPARATUS FOR THE PRODUCTION OF CONTROLLED
SATURATED STEAM VAPOR
Filed May 5, 1950
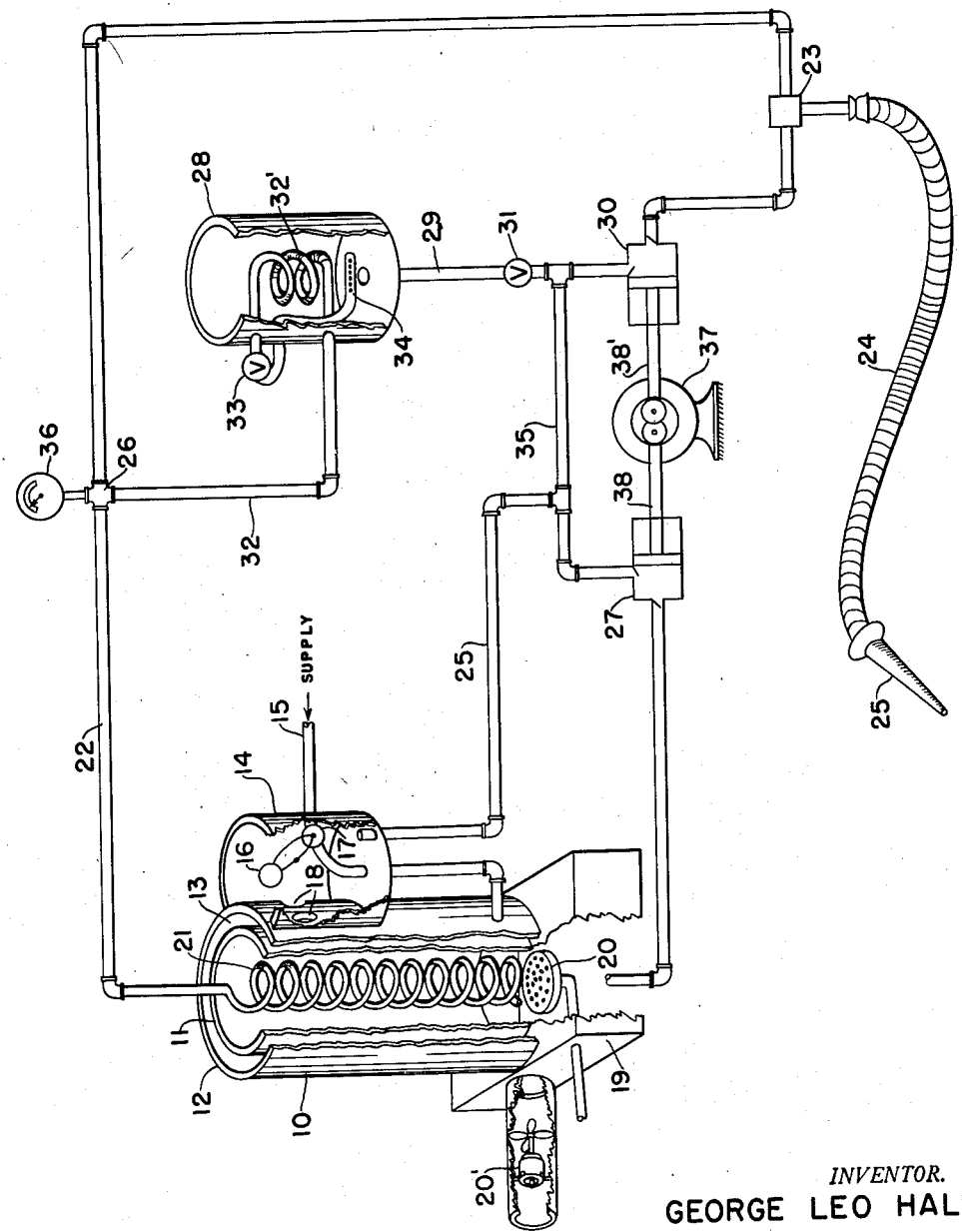
INVENTOR.
GEORGE LEO HALL
BY
ATTORNEY Patented May 12, 1953

2,638,383

UNITED STATES PATENT OFFICE 2,638,383

APPARATUS FOR THE PRODUCTION OF CONTROLLED SATURATED STEAM VAPOR

George Leo Hall, Atlanta, Ga.

Application May 5, 1950, Serial No. 160,186

3 Claims. (Cl. 299—84)

The present invention relates broadly to apparatus for the production of selected mixtures of steam and detergent chemicals, and more particularly to such apparatus to be used in various applications such as steam cleaning, degreasing, spraying of chemicals etc.

One of the main disadvantages of somewhat similarly constructed devices is that when the desired chemicals, which are usually in powdered form, are mixed with cold water into a solution, the chemicals are merely held in suspension in the water temporarily and, when left standing for a short time, a considerable percentage of such chemicals will separate from the water and be deposited, in the form of crystals, in certain parts of the mechanism, thus causing considerable annoyance and expense to the owner of the machine. It is a well known fact that such chemicals dissolve more readily and are held in suspension longer in hot water than in cold.

Some machines now being manufactured pump the chemical solution through the heating coils. The disadvantages of this construction will be obvious when it is realized that some detergents and other chemicals break down under excessive heat generated in the heating coils; and, when the coils are allowed to cool off, crystallization may take place resulting in a scale formation on the inner surface of the coils which is subsequently baked onto the metal surface when the machine is again fired up. Gradual accumulation of such scale will eventually clog the coils requiring costly replacement. Many former machines of a similar nature, in order to eliminate this costly trouble, have provided for the syphoning of the chemical solution, with the aid of an additional hose, to the outlet nozzle in an attempt to bypass the heating coils and at the same time obtain a thorough mixing of the chemicals and steam vapor. It is apparent that such a system could not be effective since no mixing chamber is provided and the chemicals and steam vapor are more or less thrown together as they are both discharged into the air. In the present invention, the mixing chamber is provided at the inner connecting end of the hose; and, since the hose is usually twisted and moved about during its use, it provides a long, distorted mixing chamber which thoroughly mixes the chemical solution and steam vapor before they are discharged from the end of the outlet nozzle.

Another disadvantage in such machines as above mentioned is that no provision has been made to automatically agitate the chemical solution and to keep the solution tank hot while the machine is operating in order that only thoroughly mixed chemical solution, in a preheated condition, flows through the solution lines, check valves, and pumping units of the machine.

Still another disadvantage of other similar machines is the fact that both water and chemical solutions are introduced into the pumping units and heating coils cold, resulting not only in the disintegration of the chemical solution, but in sub-zero weather such liquids freeze before reaching the pumping units; and, as a consequence, such machines cannot be used except in enclosed areas where the temperature is above 30 or 32 degrees F. since even if such machines should be started up in a warm enclosure no provision has been made to keep the water and chemical solutions from freezing if the unit is taken outside to be operated during sub-zero weather.

One object of my present invention is to provide apparatus for producing steam, steam vapor, or hot water, and wherein any desired chemical may be introduced in any proportion into the steam or hot water line.

Another object of the invention is to provide steam generating apparatus that will operate in sub-zero weather and wherein any desired chemical may be introduced in any proportion directly into the steam line, in a preheated state, after the steam line leaves the heating coil outlet.

A further object of the invention is to provide means whereby steam generated in the heating coils may be used to agitate the chemical solution in the solution tank or other container and to maintain same in a heated condition in order that no chemical solution flows through the solution feed lines, check valves, or pumping units, in a cold state.

A still further object of the invention is to provide means for regulating the amount of chemical solution to be fed into the steam line as above mentioned, said means to be capable of completely shutting off the supply of chemical solution to permit the flushing of an object with clear hot water or steam vapor.

From the foregoing, it will be seen that my present invention can be used for such operations as the cleaning of the exteriors of buildings, road building equipment, and other types of work which must be performed in an open area regardless of the prevailing temperature.

Other objects and advantages will be apparent in the course of the following detailed description when viewed together with the accompanying drawing in which is shown a more or less diagrammatical view of an embodiment of the invention.

In the drawing, numeral 10 designates a water heating vat provided with inner and outer side walls 11 and 12 which define a reservoir area 13. Placed adjacent the heating vat 10 is a float valve water tank 14 through which the water supply line 15 travels until it enters the lower outside wall 12 of the water vat 10 in which the water is gradually heated until it reaches openings 18, near the top of vat 10, in the outer wall 12 through which the heated water enters tank 14 which may be formed by using the outer wall 12 as the back wall of the tank 14. The water level is maintained equally in both the reservoir 13 of the vat 10 and the water supply tank 14 by means of a float 16 which operates float valve 17 in supply line 15.

In the present instance the vat 10 is shown mounted on a hollow base 19 which base is also used as a chamber for supplying air, under forced draft, to the burner 20, by means of fan 20'.

Positioned within the inner wall 11 of the water vat 10 and above the burner 20 are steam coils 21 in which semi-dry steam is produced which is carried through steam line 22 to one side of a four way coupling 26 from one side of which the steam is carried to a pressure gauge 36. From the third side of the coupling 26 steam is carried to a mixing chamber 23 and from the remaining side of the four way coupling 26 to the chemical solution tank 28, or other chemical solution container, through line 32 which is connected to a coil 32' the other end of which is perforated at 34 and through which perforations steam is introduced directly into the chemical solution for the purpose of thoroughly agitating or mixing the solution when agitator valve 33 is opened. This operation greatly assists in the mixing of the chemicals, especially the powdered variety.

I have also provided a pipe line 35 which connects both the hot water flow line 25 and the preheated solution flow line 29; and, by manipulating solution metering valve 31 any desired strength of chemical solution may be drawn into the pump cylinder 30 and discharged into the mixing chamber 23 where it mixes with steam flowing through steam line 22 and is then discharged, as a mixture of steam, hot water, and chemical solution, through the flexible hose 24 and outlet nozzle 25.

It will thus be seen that in my system the preheated water is taken from a float controlled supply tank 14 by means of two separate hose lines or tube lines (either flexible hose or metal tubes may be used) each of which lead to a separate pumping unit. One pumping unit 27 forces its supply of hot water directly through a set of steam coils 21 and same emerges in the form of semi-dry steam which mixes in a mixing chamber 23 with a supply of hot water which has passed through the other hose or tube line 35 from the said float controlled supply tank into a second pumping unit 30 which forces the said hot water into the mixing chamber 23 where it mixes with the semi-dry steam and emerges as a saturated steam vapor suitable for steam cleaning. Means have also been provided for the second pumping unit 30 to pick up a supply of chemical solution 29 which, together with the second supply of hot water mentioned above, is forced into mixing chamber 23 from which a mixture of hot water, chemical solution and semi-dry steam emerges in the form of chemically treated saturated steam vapor. The resultant mixture is made more thorough by means of having this chemically treated saturated steam flow through a length of piping or flexible tubing such as an ordinary steam hose, attached to the outlet of the said mixing chamber, before being discharged into the air or against an object to be cleaned, degreased, sterilized, or disinfected, etc. A branch of the semi-dry steam line 32 is used to heat a given chemical solution before the same is introduced into the above mentioned second pumping unit 30. Thus it will be seen that all chemical solutions are kept hot, thereby preventing crystallization which is harmful to the pumping units and especially essential check valves.

The machine is operated as follows: first, a water supply is connected to the water inlet on the machine and the water supply turned on. Next, the electrical connection is made to an outlet supplying the proper electric current and the hand switch (not shown) is turned on to supply current to electric motor 37 for reciprocally driving the pumps 27 and 30 by piston arms 38, 38, respectively, which are connected to eccentrics on the motor 37, the pumps being arranged in opposed relationship and provided with inlet and outlet check valves as shown. After the pumps have run along enough for a steady stream of water to issue from the end of the outlet nozzle 25, the fuel supply is turned on to the burner 20. Means may be provided, of course, to light the burner 20 automatically. When gauge 40 shows from 90 to 100 lbs. pressure and steam vapor is issuing in volume from the outlet nozzle 25, agitator valve 33 should be opened for a few seconds to agitate chemical solution in tank 28 during which time valve 31 should remain closed. Next, after the solution has been thoroughly agitated, valve 31 is opened to meter in the desired quantity of chemical solution. Different jobs require varying strengths of solution. Since the solution is entirely cut off when the metering valve 31 is closed, only steam and hot water reach the mixing chamber 23 thus permitting the work to be flushed off with clear hot water or steam vapor.

Let us suppose it is desired to degrease and clean a certain piece of machinery and it has been decided that the best agent for this work would be a mixture of steam vapor and a detergent solution. The above mentioned procedure should be followed and first a full force of steam should be applied to the work in order to knock off hardened deposits of grease and dirt. Next, a rich mixture of steam and detergent solution should be applied, followed by a gradual decrease of the detergent solution, by manipulating solution metering valve 31, and finally rinsing the machinery with clear steam vapor or hot water.

The example given is typical of a common cleaning or degreasing operation. Other operations may also be performed with the same effectiveness and ease as the above mentioned, such as: spraying insecticides, disinfectants, water soluble paints, including mill white and whitewash, etc. In fact, in any operation where instantaneous steam vapor is desired, the use of the aforementioned unit is of great advantage.

It should be remembered that both the main reservoir 13 and the water supply tank 14 are open vats and are not intended to be of the pressurized type as found in prior art; and, due to the above, neither can explode or become damaged from freezing of the water when the machine is left idle outdoors in sub-zero weather.

While I have disclosed only the steam generated in the heating coils as a means to heat the water lines and tank, solution lines and tank, pumping units, etc., it is obvious that heat can be applied in other ways such as by the use of electrical or chemical heating elements, etc., to accomplish this purpose and to prevent freezing especially if the machine is to be left, in a non-operating state, for any length of time in freezing temperature. So long as the machine is operating and generating steam or hot water, the unit described is not subject to freezing hazards.

From the above description of operations it is readily apparent that such a machine is versatile, compact, and can be operated expertly by a novice. Any combination of pressures and mixtures is possible to suit a given work to be performed. The detergents or other chemicals will readily mix with the steam or water since they enter the mixing chamber 23 in a preheated state.

It will be obvious that my invention provides needed apparatus of great convenience and usefulness, and that while I have shown and described my invention in a very practical embodiment thereof, various changes and adaptations may be made without departing from the scope of my invention as defined in the appended claims.

I claim:

1. In a system of the class described, a reservoir in heat exchange relation with a source of heat, means for supplying water to said reservoir, means for controlling the level of water in said reservoir, a coil in heat exchange relation with said source of heat, fluid pumping means connected to pump water from said reservoir to said coil, a mixing chamber, conduit means connecting said coil to said mixing chamber, a chemical container, pipe means leading into said chemical container for the introduction of steam to agitate and heat the chemical therein, pipe means for mixing water from said reservoir with chemical from said container to form a solution, fluid pumping means connected to by-pass said coil and to pump said solution direct to said mixing chamber, and means connected to said mixing chamber for dispensing the contents thereof.

2. In a system of the class described, a reservoir in heat exchange relation with a source of heat, a float valve tank in heat exchange relation with said source of heat, pipe means passing through said float valve tank for supplying water to said reservoir, said float valve tank being connected to said reservoir for the passage of water from said reservoir to said float valve tank, a float valve in said float valve tank for controlling the level of water in said float valve tank and said reservoir, a coil in heat exchange relation with said source of heat, fluid pumping means connected to pump water from said float valve tank to said coil, a mixing chamber, conduit means connecting said coil to said mixing chamber, a chemical container, pipe means for mixing water from said float valve tank with chemical from said container to form a solution, fluid pumping means connected to pump said solution to said mixing chamber, and means connected to said mixing chamber for dispensing the contents thereof.

3. In a system of the class described, a reservoir in heat exchange relation with a source of heat, a float valve tank in heat exchange relation with said reservoir, pipe means passing through said float valve tank for supplying water to said reservoir, said float valve tank being connected to said reservoir for the passage of water from said reservoir to said float valve tank, a float valve in said float valve tank for controlling the level of water in said float valve tank and said reservoir, a heat exchange coil within the confines of said reservoir, fluid pumping means connected to pump water from said float valve tank to said heat exchange coil, a mixing chamber, conduit means connecting said heat exchange coil to said mixing chamber, a chemical container, valve controlled pipe means leading from said conduit means into said chemical container for the introduction of steam to agitate and heat the chemical therein, pipe means for mixing water from said float valve tank with chemical from said container to form a solution, fluid pumping means connected to pump said solution to said mixing chamber, and a flexible hose connected to said mixing chamber and provided with a nozzle for dispensing the contents of said mixing chamber.

GEORGE LEO HALL.

References Cited in the file of this patent

UNITED STATES PATENTS

| Number | Name | Date |
| --- | --- | --- |
| 2,345,614 | Malsbary et al. | Apr. 4, 1944 |
| 2,487,348 | Malsbary et al. | Nov. 8, 1949 |